United States Patent [19]

Ueda et al.

[11] Patent Number: 4,559,391

[45] Date of Patent: Dec. 17, 1985

[54] PROCESS FOR PRODUCING POLY(ALLYLAMINE) DERIVATIVES

[75] Inventors: Toshio Ueda; Tadashi Kato; Ryuichi Mukai; Susumu Harada, all of Koriyama, Japan

[73] Assignee: Nitto Boseki Co., Ltd., Fukushima, Japan

[21] Appl. No.: 670,544

[22] Filed: Nov. 13, 1984

[30] Foreign Application Priority Data

Nov. 14, 1983 [JP] Japan ................................. 58-213697

[51] Int. Cl.[4] ............................................... C08F 8/30
[52] U.S. Cl. ................................. 525/366; 525/328.2; 526/218; 526/219; 526/310
[58] Field of Search ............................. 525/366, 328.2; 526/218, 219, 310

[56] References Cited

U.S. PATENT DOCUMENTS

| | | | |
|---|---|---|---|
| 2,456,428 | 12/1948 | Parker | 525/328.2 |
| 2,662,877 | 12/1953 | Chuney | 526/310 |
| 2,949,442 | 8/1960 | Clarier et al. | 526/310 |
| 3,032,539 | 5/1962 | Schuller et al. | 526/310 |
| 3,057,833 | 10/1962 | Devlin | 526/310 |
| 3,062,798 | 11/1962 | Lovett | 526/310 |
| 3,104,205 | 9/1963 | Hainer et al. | 525/328.2 |
| 3,862,059 | 1/1975 | Greco et al. | 525/328.2 |
| 4,121,986 | 10/1978 | Buttaerd | 526/310 |
| 4,504,640 | 3/1985 | Harada et al. | 526/218 |

*Primary Examiner*—Joseph L. Schofer
*Assistant Examiner*—Bernard Lipman
*Attorney, Agent, or Firm*—Bert J. Lewen; Henry Sternberg

[57] ABSTRACT

Poly(allylamine salt) of high polymerization degree is obtained in high yield by the polymerization of monoallylamine salt with a specified radical-polymerization initiator having in the molecule an azo group. Poly(allylurea) is obtained by reacting said poly(allylamine salt) with cyanic acid salts.

3 Claims, No Drawings

PROCESS FOR PRODUCING POLY(ALLYLAMINE) DERIVATIVES

BACKGROUND OF THE INVENTION

1. Field of the Invention

This invention relates to a process for producing poly(allylamine) derivatives. More particularly, it relates to the procedures for producing poly(allylurea).

2. Description of the Prior Art

Being a cationic polymer having a primary amino group, poly(allylamine) would be supposed to be highly reactive and to react with various compounds. Accordingly, if it is actually possible to introduce various substituent groups into poly(allylamine) by the reaction with various compounds, there will be provided a means to modify the properties of poly(allylamine) so as to meet the requirements of a particular use. This will be of industrial significance. It has, however, been not easy to obtain poly(allylamine) itself which is the starting material to prepare derivatives by the introduction of various groups. In the presence of common polymerization initiators, allylamine polymerizes to a polymer of low polymerization degree in a low yield. A poly(allylamine) of high polymerization degree is obtained only by the radiation polymerization. For several reasons, however, the radiation polymerization is not a technique accessible to anyone who desires to utilize it. Therefore, it has been difficult to produce on a commercial scale poly(allylamine) and, in turn, poly(allylamine) derivatives.

Further, for instance, it is predictable from its structure that poly(allylurea), one of the poly(allylamine) derivatives, will exhibit an ability to form a strong hydrogen bond and, by virtue of this property, would find various uses including the use as a flocculant. However, when it is tried to polymerize allylurea, there is obtained only a polymer of too low a polymerization degree and in too low a yield to be of a practical value. It is possible to obtain a poly(allylurea) of high polymerization degree by polymerizing allylamine by use of the radiation polymerization technique and reacting the poly(allylamine) with a cyanate salt to effect carbamoylation. This process, however, is not practicable owing to the radiation polymerization technique which is difficult to carry out on a commercial scale. Therefore, development of a commercial process for producing poly(allylurea) has been awaited.

SUMMARY OF THE INVENTION

Under the circumstances described above, the present inventors carried out an extensive study to develop a practicable process for producing poly(allylurea) and, as a result, found that poly(allylurea) is obtained in high yields by polymerizing an inorganic acid salt of monoallylamine with a radical-polymerization initiator having an azo group in the molecule to produce a poly(allylamine salt) in high yields, and reacting the resulting poly(allylamine salt) with a cyanic acid salt. The present invention is predicated upon this discovery. The present invention is to provide a process for producing poly(allylurea), which comprises polymerizing a monoallylamine salt with a radical-polymerization initiator having an azo group in the molecule, and allowing the resulting poly(allylamine salt) to react with a salt of cyanic acid.

DETAILED DESCRIPTION OF THE INVENTION

In the present process for producing poly(allylurea), at first poly(allylamine salt) is produced by polymerizing an inorganic acid salts of monoallylamine with a polymerization initiator. The initiators used according to this invention are those having an azo group in the molecule. Typical examples are salts of the azo compounds represent by the following general formule [I] with inorganic or organic acids such as hydrochloric acid, sulfuric acid, phosphoric acid, alkylsulfuric acids, p-toluenesulfonic acid, formic acid, acetic acid, and propionic acid:

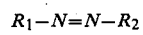

$$R_1-N=N-R_2 \qquad [\text{I}]$$

wherein at least one, preferably both, of $R_1$ and $R_2$ is a group which contains a cationizable nitrogen atom and which is selected from the group consisting of aminoalkyl, aminoaryl, amidinylalkyl, amidinylaryl, aminoalkaryl, aminoaralkyl, amidinylaralkyl, amidinylalkaryl, cyanoaminoalkyl, and cyanoaminoalkaryl; when only one of $R_1$ and $R_2$ is a group containing a cationizable nitrogen atom, the other is a group selected from the group consisting of alkyl, aryl, alkaryl, aralkyl, cyanoalkyl, cyanoaryl, cyanoalkaryl, and cyanoaralkyl; and $R_1$ and $R_2$ may jointly form a single alkylene group represented by the general formula

wherein R is a group selected from the group consisting of alkylene, alkylalkylene, and arylalkylene; covalent bonds (a) and (b) combine with each nitrogen atom of the azo group to form an azo-containing ring; and X is a group containing a cationizable nitrogen atom.

Of the initiators represented by the general formula [I], especially preferred are those having a secondary or tertiary carbon atom adjacent to the azo group. Typical of such compounds are as given below.

2,2′-Diamidinyl-2,2′-azopropane hydrochloride, 2,2′-diamidinyl-2,2′-azobutane hydrochloride, 2,2′-diamidinyl-2,2′-azopentane hydrochloride, 2,2′-bis(N-phenylamidinyl)-2,2′-azopropane hydrochloride, 2,2′-bis((N-phenylamidinyl)-2,2′-azobutane hydrochloride, 2,2′-bis(N,N-dimethylamidinyl)-2,2′-azopropane hydrochloride, 2,2′-bis(N,N-dimethylamidinyl)-2,2′-azobutane hydrochloride, 2,2′-bis(N,N-diethylamidinyl)-2,2′-azopropane hydrochloride, 2,2′-bis(N,N-diethylamidinyl)-2,2′-azobutane hydrochloride, 2,2′-bis(N-n-butylamidinyl)-2,2′-azopropane hydrochloride, 2,2′-bis(N-n-butylamidinyl)-2,2′-azobutane hydrochloride, 3,3′-bis(N,N-di-n-butylamidinyl)-3,3′-azopentane hydrochloride, azo-bis-N,N′-dimethyleneisobutyl-amidine hydrochloride.

Azonitriles of the quaternary ammonium salt type obtained by quaternizing, by means of dimethyl sulfate or methyl p-toluenesulfonate, such compounds as 2,2′-azobis(2-methyl-4-diethylamino)butyronitrile hydrochloride, 2,2′-azobis(2-methyl-4-dimethylamino)butyronitrile hydrochloride, 2,2′-azobis(2-methyl-4-diethyl-amino)butyronitrile hydrochloride, 2,2′-azobis(2-methyl-4-diethylamino)butyronitrile, or 2,2′-azobis(2-methyl-4-dimethylamino)butyronitrile.

3,5-Diamidinyl-1,2-diazo-1-cyclopentene hydrochloride, 3-methyl-3,4-diamidinyl-1,2-diazo-1-cyclopentene hydrochloride, 3-ethyl-3,5-diamidinyl-1,2-diazo-1-cyclopentene hydrochloride, 3,5-dimethyl-3,5-diamidinyl-1,2-diazo-1-cyclopentence hydrochloride, 3,6-diamidinyl-1,2-diazo-1-cyclohexene hydrochloride, 3-phenyl-3,5-diamidinyl-1,2-diazo-1-cyclopentene hydrochloride, 3,5-diphenyl-3,5-diamidinyl-1,2-diazo-1-lcyclopentence hydrochloride.

Since the process for polymerizing an inorganic acid salt of monoallylamine in the presence of an inorganic or organic acid salt of the azo compounds represented by the general formula [I] has been disclosed by the present inventors in Japanese patent application No. 54,988/83 (U.S. patent Ser. No. 379,983), now U.S. Pat. No. 4,504,640, details are omitted from the present specification.

Other typical examples of the initiators used in the polymerization of monoallylamine salts according to this invention are those represented by the following general formula [III] or [IV]:

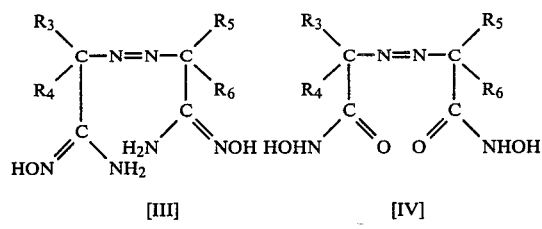

[III]   [IV]

wherein $R_3$, $R_4$, $R_5$ and $R_6$ are the same or different hydrocarbon radicals. Specially preferred hydrocarbon radicals, $R_3$, $R_4$, $R_5$ and $R_6$, are straight- or branched-chain alkyls having 1 to 4 carbon atoms, cycloalkyls having 3 to 6 carbon atoms, phenyl, and benzyl. $R_3$ and $R_4$ or/and $R_5$ and $R_6$ jointly with carbon atoms, to which the hydrocarbon radicals are attached, may form a ring. Especially preferred initiators of the formulas [III] and [IV] are as follows:

[III]   [IV]

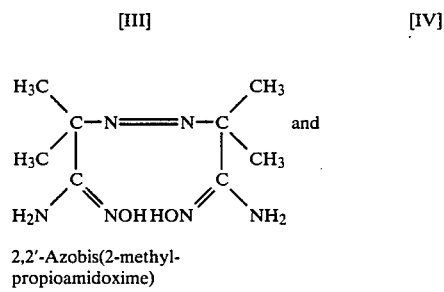

2,2'-Azobis(2-methyl-propioamidoxime)

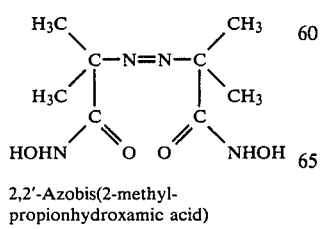

2,2'-Azobis(2-methyl-propionhydroxamic acid)

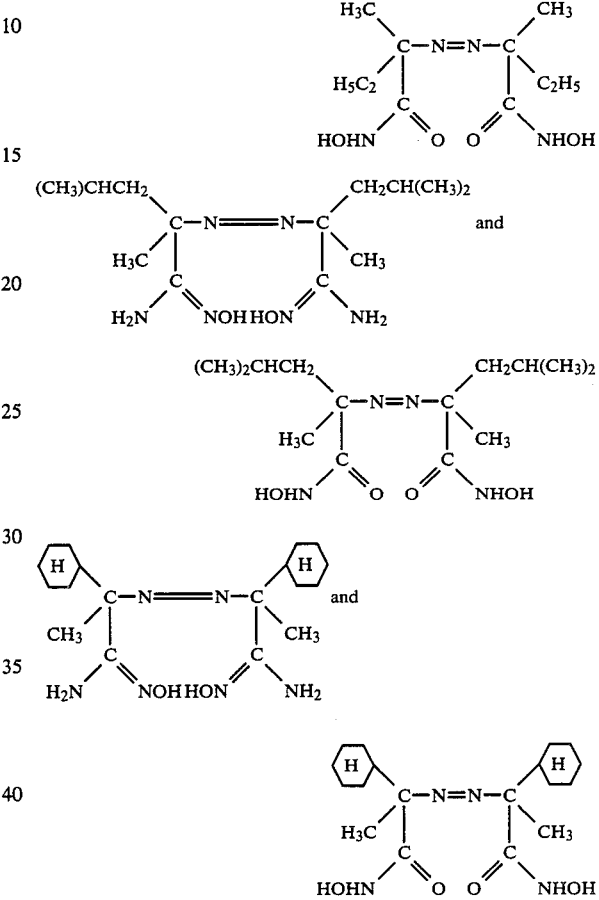

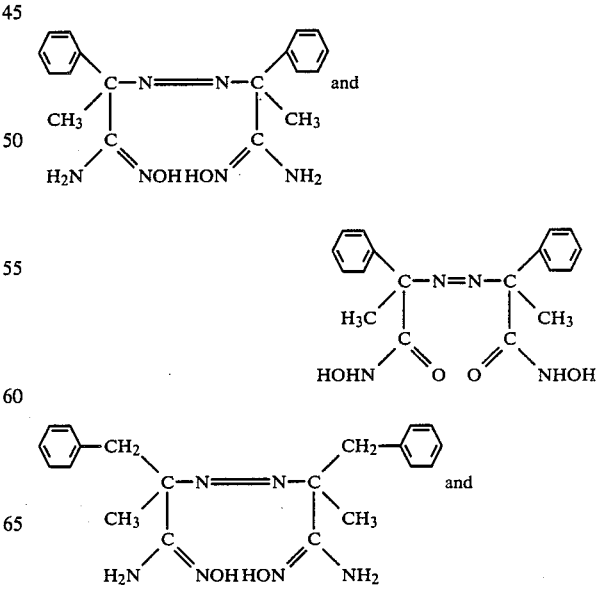

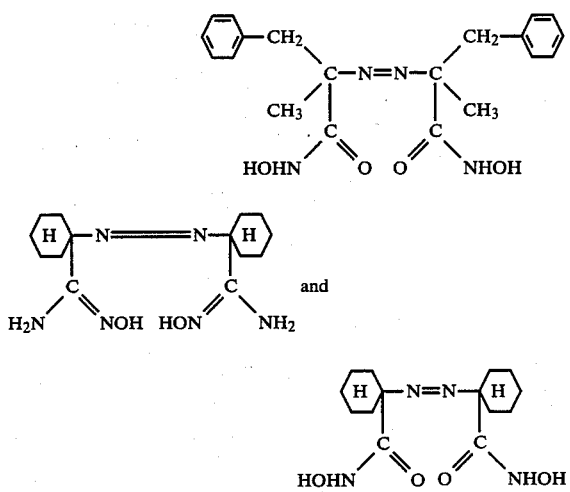

It is needless to say that the invention is not limited to these examples.

The process for polymerizing an inorganic acid salt of monoallylamine by using as initiator a compound of the general formula [III] or [IV] is disclosed by the present inventors in Japanese patent application, "A process for producing polymerized monoallylamine" (application date: Nov. 10, 1983).

The amount used of an intiator is 0.1 to 10, usually 1 to 6, % by weight based on the inorganic acid salt of monoallylamine. The polymerization temperature is 30° to 100° C., usually 40° to 70° C., depending upon the chemical structure of the initiator. The initial monomer concentration is higher the better within the solubility range. The concentration is usually 10 to 85% by weight. Preferable inorganic acid salts of monoallyamine are hydrochloride, sulfate, sulfite, and phosphate. The polymerization is carried out in polar solvents such as water, inorganic acids (e.g. hydrochloric acid, sulfuric acid, phosphoric acid, and polyphosphoric acid), aqueous solutions thereof, organic acids (e.g. formic acid, acetic acid, propionic acid, lactic acid, etc.), aqueous solutions thereof, alcohols, dimethyl sulfoxide, dimethylformamide, or aqueous solutions of inorganic saets (e.g. zinc chloride, calcium chloride, and magnesium chloride).

In carrying out the polymerization, although the inorganic acid salt of monoallylamine is used usually in the form of crystals separated from the mother liquor, yet it can be used in the form of solution in which the salt has been produced by the addition of monoallylamine and an inorganic acid to the polar solvent. When the inorganic acid or an aqueous solution thereof is used as the polymerization medium, it is of course possible to add a predetermined quantity of monoallylamine to the inorganic acid or the aqueous solution thereof and to allow the polymerization to take place in the resulting solution. The polymerization is carried out preferably in an inert gas such as nitrogen, because the atmospheric oxygen hinders the polymerization to some degrees.

The procedure of preparing poly(allylurea) by the reaction between the poly(allylamine salt) obtained above and a cyanate salt is described below.

The poly(allylamine salt) can be used either as a solution obtained by the above-mentioned polymerization procedure or after precipitation from the solution by the addition of a large amount of methanol followed successively by filtration, drying, and dissolution in water. When poly(allylamine salt) of higher molecular weight is required, the molcular weight can be increased by the action of a bifunctional reagent such as an epihalohydrin or ethylene dichloride to cause partial crosslinking.

A 5- to 50-% solution of poly(allylamine salt) dissolved in water or a polar solvent is heated at 30° C. to 80° C. After dropwise addition of an aqueous solution of a cyanate salt (e.g. potassium or sodium cyanate), the resulting mixture is allowed to react for 10 to 20 hours. If necessary, the by-product salt [potassium chloride when poly(allylamine hydrochloride) is reacted with potassium cyanate] is removed by subjecting the reaction mixture to dialysis, ultrafiltration, or gel permeation.

The invention is further illustrated with reference to examples.

EXAMPLE 1

Preparation of poly(allylurea)

To 57.1 g of monoallylamine, was added dropwise, at 10°–20° C., 104.2 g of 35-% hydrochloric acid to yield an aqueous solution containing 59.1% of monoallylamine hydrochloride. The resulting aqueous solution was concentrated in a rotary evaporator to a concentration of 75%. To the concentrated solution, while being maintained at 60° C. by heating, was added dropwise over a period of 3 hours a 15-% aqueous solution containing 2.34 g (2.5% by weight based on the monomer) of 2,2′-diamidinyl-2,2′-azopropane hydrochloride. After completion of the dropwise addition, the mixture was kept at 60° C. for 15 hours to complete the polymerization. The polymerization mixture was poured into a large volume of methanol to precipitate the polymer. The polymer was collected by filtration and dried to yield 86 g (92% yield) of the polymer which showed an intrinsic viscosity of 0.32 at 30° C. in N/10 aqueous sodium chloride solution. A 20 g portion (0.214 mole in terms of monoallylamine) of the resulting poly(allylamine hydrochloride) was dissolved in 80 g of water. To the resulting solution, while being heated at 50° C., was added dropwise an aqueous solution containing 17.3 g (0.214 mole) of potassium cyanate dissolved in 25 g of water. The mixture was kept at the same temperature for 20 hours. After completion of the reaction, the reaction mixture was dialyzed against water through hollow fibers for 24 hours at 50° C. to remove the by-product potassium chloride. The dialyzate was concentrated to 100 g, precipitated with acetone, collected by filtration, and dried to yield 18.4 g of a polymer. Upon colloidal titration and acidalkali titration, the polymer was found to be completely non-cationic, indicating quantitative progress of the reaction.

EXAMPLES 2 to 4

Preparation of poly(allylurea)

In a manner similar to that in Example 1, the same poly(allylamine hydrochloride) as used in Example 1 was allowed to react with varying amounts of potassium cyanate as shown in Table 1.

TABLE 1

| Example No. | Poly(allylamine) g (mole) | Potassium cyanate g (mole) | Yield g | Degree of carbamoylation* % |
|---|---|---|---|---|
| 2 | 20.0 (0.214) | 12.1 (0.150) | 18.7 | 69 |
| 3 | 20.0 (0.214) | 8.67 (0.107) | 19.0 | 50 |
| 4 | 20.0 (0.214) | 5.20 (0.0641) | 17.6 | 29 |

Note:
*As determined by colloidal titration.

It is seen from Table 1 that the reaction proceeded nearly quantitatively in each case.

EXAMPLE 5

Preparation of poly(allylurea)

An equal amount of water was added to 37.4 g of poly(allylamine hydrochloride) (intrinsic viscosity of 0.30 in N/10 aqueous sodium chloride solution at 30° C.) prepared by the polymerization in a manner similar to that in Example 1. To the resulting solution, were added 36 g (90 mole-%) of a 40-% aqueous sodium hydroxide solution and 0.148 g (0.4 mole-%) of epichlorohydrin. The mixture was heated at 50° C. for 30 hours, while the reaction system gradually became viscous. The reaction mixture was added to methanol to precipitate 37 g of a polymer having an intrinsic viscosity of 1.4 in N/10 aqueous sodium chloride solution at 30° C. A 20 g portion of the polymer was reacted with 17.3 g of potassium cyanate to effect carbamoylation. The yield was 19.7 g and the carbamoylation degree was 98%.

What is claimed is:

1. A process for producing a poly(allylurea), which comprises polymerizing an inorganic acid salt of monoallylamine with a radical-polymerization initiator having an azo group in the molecule, and allowing the resulting poly(allylamine salt) to react with a cyanic acid salt.

2. A process according to claim 1, wherein the radical-polymerization initiator having an azo group in the molecule is a salt of an azo compound represented by the following general formula [I] with an inorganic or organic acid selected from the group consisting of hydrochloric acid, sulfuric acid, phosphoric acid, alkylsulfuric acids, p-toluenesulfonic acid, formic acid, acetic acid, and propionic acid:

$$R_1-N=N-R_2 \qquad [I]$$

wherein at least one, preferably both, of $R_1$ and $R_2$ is a group which contains a cationizable nitrogen atom and which is selected from the group consisting of aminoalkyl, aminoaryl, amidinylalkyl, amidinylaryl, aminoalkaryl, aminoaralkyl, amidinylaralkyl, amidinylalkaryl, cyanoaminoalkyl, and cyanoaminoalkaryl; when only one of $R_1$ and $R_2$ is a group containing a cationizable nitrogen atom, the other is a group selected from the group consisting of alkyl, aryl, alkaryl, aralkyl, cyanoalkyl, cyanoaryl, cyanoalkaryl, and cyanoaralkyl; and $R_1$ and $R_2$ may jointly form a single alkylene group represented by the general formula

wherein R is a group selected from the group consisting of alkylene, alkylalkylene, and arylalkylene; covalent bonds (a) and (b) combine with each nitrogen atom of the azo group to form an azo-containing ring; and X is a group containing a cationizable nitrogen atom.

3. A process according to claim 1, wherein the cyanic acid salt is potassium or sodium cyanate.

* * * * *